(12) United States Patent
Sanham et al.

(10) Patent No.: US 11,235,651 B2
(45) Date of Patent: Feb. 1, 2022

(54) RETRACTABLE ROOF

(71) Applicants: McLaren Automotive Limited, Woking (GB); Webasto SE, Stockdorf (DE)

(72) Inventors: Luke Sanham, Woking (GB); Michael Ertl, Hengersberg (DE)

(73) Assignees: McLaren Automotive Limited, Woking (GB); Webasto SE, Stockdorf (DE)

( * ) Notice: Subject to any disclaimer, the term of this patent is extended or adjusted under 35 U.S.C. 154(b) by 73 days.

(21) Appl. No.: 16/678,111

(22) Filed: Nov. 8, 2019

(65) Prior Publication Data

US 2020/0148045 A1 May 14, 2020

(30) Foreign Application Priority Data

Nov. 9, 2018 (GB) ...................................... 1818324

(51) Int. Cl.
*B60J 7/16* (2006.01)
*E05F 15/603* (2015.01)
*B60J 7/20* (2006.01)

(52) U.S. Cl.
CPC ........... *B60J 7/1692* (2013.01); *B60J 7/1678* (2013.01); *B60J 7/20* (2013.01); *E05F 15/603* (2015.01);
(Continued)

(58) Field of Classification Search
CPC ... B60J 7/20; B60J 7/203; B60J 7/1204; B60J 7/1692; B60J 7/1678; E05F 15/603
(Continued)

(56) References Cited

U.S. PATENT DOCUMENTS 6,318,792 B1  11/2001  Neubrand et al.
6,353,300 B1  3/2002  Matsui et al.
(Continued)

FOREIGN PATENT DOCUMENTS

DE  102017002817  7/2018
FR  2890005  3/2007
(Continued)

OTHER PUBLICATIONS

GB1818324.4, "Search Report Under Section 17(5) dated Apr. 30, 2019, 5 pages."
(Continued)

*Primary Examiner* — Joseph D. Pape
(74) *Attorney, Agent, or Firm* — Kilpatrick Townsend & Stockton LLP (57) ABSTRACT

A vehicle comprising: an occupant cabin; a retractable roof configured to move between a deployed configuration where the roof covers the occupant cabin and a retracted configuration; a housing configured to house the retractable roof when the roof is in the retracted configuration; a moveable cover configured to close the housing and move between a closed configuration where the moveable cover closes the housing and an open configuration to permit the retractable roof to move between the deployed configuration and the retracted configuration; a first electric motor coupled to the retractable roof to be capable of imparting motion to the retractable roof so that, when the first electric motor is activated, the first electric motor causes the retractable roof to move between the deployed configuration and the retracted configuration; a second electric motor coupled to the moveable cover to be capable of imparting motion to the movable cover so that, when the second electric motor is activated, the second electric motor causes the moveable cover to move between the closed configuration and the
(Continued)

open configuration; and a control unit configured to control the activation of the first and second electric motors so that, during the movement of the retractable roof between the deployed configuration and the retracted configuration, the moveable cover moves partially simultaneously, with the retractable roof, between the closed configuration and open configuration.

22 Claims, 5 Drawing Sheets

(52) U.S. Cl.
CPC ... *E05Y 2900/542* (2013.01); *E05Y 2900/548* (2013.01)

(58) Field of Classification Search
USPC .......................................... 296/136.05, 136.06
See application file for complete search history.

(56) References Cited

U.S. PATENT DOCUMENTS

| | | | |
|---|---|---|---|
| 7,654,604 B2* | 2/2010 | Eichhorst | B60J 7/0573 296/107.08 |
| 10,647,186 B2 | 5/2020 | Kawahara | |
| 2003/0052508 A1* | 3/2003 | Obendiek | B60J 7/202 296/107.08 |
| 2004/0075294 A1* | 4/2004 | Antreich | B60J 7/205 296/136.06 |
| 2007/0222254 A1 | 9/2007 | Wagner | |
| 2009/0160225 A1 | 6/2009 | Matsui et al. | |
| 2011/0227365 A1 | 9/2011 | Mao et al. | |
| 2013/0038084 A1 | 2/2013 | Kinnanen et al. | |
| 2019/0070942 A1 | 3/2019 | Kawahara | |

FOREIGN PATENT DOCUMENTS

| | | |
|---|---|---|
| WO | 03095254 | 11/2003 |
| WO | 2010034247 | 4/2010 |
| WO | 2017159322 | 9/2017 |

OTHER PUBLICATIONS

EP Application No. 19208162.8 , "Communication per Article 94(3)", dated Feb. 11, 2021, 7 pages.
European Application No. EP19208162.8 , "Extended European Search Report", dated Mar. 26, 2020, 8 pages.

* cited by examiner

RETRACTABLE ROOF

This application claims priority to GB Application No. 1818324.4 filed Nov. 9, 2018, and titled "Retractable Roof," the entirety of which is incorporated herein by reference.

This invention relates to a vehicle comprising a retractable roof and a moveable cover, for a retractable roof housing, that move at least partially simultaneously.

Many cars are fitted with retractable roofs. These roofs tend to come in two types: a soft-top retractable roof and a hard-top retractable roof. Soft-top retractable roofs are generally constructed from a frame and flexible material. The soft-top roof can retract into a retracted configuration by means of the flexible material folding up to permit the parts of the frame to move together and thus take up less room. Hard-top retractable roofs are generally constructed from one or more roof elements that are attached to support members which permit motion of the roof element(s) relative to each other and the rest of the vehicle. These roof element(s) can thus be moved into a retracted configuration by means of movement of the roof element(s) so that they move from covering the occupant cabin of the vehicle to being packed in a housing so that they no longer cover the occupant cabin.

The retractable roof is generally stored in a housing located rearward of the occupant cabin when the retractable roof is in the retracted configuration. This housing generally has a cover which covers the housing and thus covers the retractable roof when in the retracted configuration. The cover is usually a moveable cover so that it can move to an open position to allow the retractable roof to move between a deployed configuration and the retracted configuration.

The movement of the roof between the deployed configuration and the retracted configuration generally takes place when the car is either stationary or moving slowly. The car may even be configured to limit the activation of the movement of the roof to when the car is either stationary or moving below a predefined speed. This is done because it may be unsafe to move the roof at vehicle speeds higher than the predefined speed. It is therefore desirable for the transition for the roof between the deployed configuration and the retracted configuration to be as quick as possible so that the time period for which the car either needs to be stationary or driven below the predefined speed is kept to a minimum. It would therefore be desirable to have a vehicle with a retractable roof that has an increased speed of transition for the roof between the deployed configuration and the retracted configuration.

According to a first aspect of the present invention there is provided a vehicle comprising: an occupant cabin; a retractable roof configured to move between a deployed configuration where the roof covers the occupant cabin and a retracted configuration; a housing configured to house the retractable roof when the roof is in the retracted configuration; a moveable cover configured to close the housing and move between a closed configuration where the moveable cover closes the housing and an open configuration to permit the retractable roof to move between the deployed configuration and the retracted configuration; a first electric motor coupled to the retractable roof to be capable of imparting motion to the retractable roof so that, when the first electric motor is activated, the first electric motor causes the retractable roof to move between the deployed configuration and the retracted configuration; a second electric motor coupled to the moveable cover to be capable of imparting motion to the movable cover so that, when the second electric motor is activated, the second electric motor causes the moveable cover to move between the closed configuration and the open configuration; and a control unit configured to control the activation of the first and second electric motors so that, during the movement of the retractable roof between the deployed configuration and the retracted configuration, the moveable cover moves partially simultaneously, with the retractable roof, between the closed configuration and open configuration.

The first electric motor may be configured to output a first motor motion signal indicating an amount of motion imparted by the first electric motor, the second electric motor may be configured to output a second motor motion signal indicating an amount of motion imparted by the second electric motor, and the control unit may be configured to: receive the first motor motion signal and second motor motion signal, and control the activation of the first and second electric motors in dependence on the first motor motion signal and the second motor motion signal. The first electric motor may impart a rotational motion on a first shaft and the first motor motion signal may indicate the amount of motion imparted on the first shaft. The first motor motion signal may indicate when a full revolution of the first shaft has been completed. The second electric motor may impart a rotational motion on a second shaft and the second motor motion signal may indicate the amount of motion imparted on the second shaft. The second motor motion signal may indicate when a full revolution of the second shaft has been completed. The control unit may be configured to control the activation of the first and second electric motors in dependence on the number of full revolutions completed by the first and/or second shafts.

The control unit may be configured to control the activation of the first and second electric motors so that during the movement of the retractable roof from the deployed configuration to the retracted configuration: the moveable cover moves from the closed configuration to a first intermediate configuration positioned between the closed configuration and the open configuration whilst the retractable roof remains stationary; and the moveable cover moves from the first intermediate configuration to the open configuration whilst the retractable roof moves from the deployed configuration to a second intermediate configuration positioned between the deployed configuration and the retracted configuration. The control unit may be configured to control the activation of the first and second electric motors so that during the movement of the retractable roof from the deployed configuration to the retracted configuration: the moveable cover moves from the open configuration to the closed configuration at least partially simultaneously with the retractable roof moving from the second intermediate configuration to the retracted configuration. The control unit may be configured to control the activation of the first and second electric motors so that during the movement of the retractable roof from the deployed configuration to the retracted configuration: the moveable cover moves from the open configuration to the closed configuration whilst the retractable roof moves from the second intermediate configuration to the retracted configuration.

The control unit may be configured to control the activation of the first and second electric motors so that during the movement of the retractable roof from the deployed configuration to the retracted configuration: the moveable cover moves from the closed configuration to a first intermediate configuration positioned between the closed configuration and the open configuration whilst the retractable roof remains stationary; and the moveable cover moves from the first intermediate configuration to the open configuration whilst the retractable roof moves from the deployed configuration to the retracted configuration.

The control unit may be configured to control the activation of the first and second electric motors so that during the movement of the retractable roof from the retracted configuration to the deployed configuration: the moveable cover moves from the closed configuration to a third intermediate configuration positioned between the closed configuration and the open configuration whilst the retractable roof remains stationary; and the moveable cover moves from the third intermediate configuration to the open configuration whilst the retractable roof moves from the retracted configuration to a fourth intermediate configuration positioned between the retracted configuration and the deployed configuration. The control unit may be configured to control the activation of the first and second electric motors so that during the movement of the retractable roof from the retracted configuration to the deployed configuration: the moveable cover moves from the open configuration to the closed configuration at least partially simultaneously with the retractable roof moving from the fourth intermediate configuration to the deployed configuration. The control unit may be configured to control the activation of the first and second electric motors so that during the movement of the retractable roof from the retracted configuration to the deployed configuration: the moveable cover moves from the open configuration to the closed configuration whilst the retractable roof moves from the fourth intermediate configuration to the deployed configuration.

The control unit may be configured to control the activation of the first and second electric motors so that during the movement of the retractable roof from the retracted configuration to the deployed configuration: the moveable cover moves from the closed configuration to a third intermediate configuration positioned between the closed configuration and the open configuration whilst the retractable roof remains stationary; and the moveable cover moves from the third intermediate configuration to the open configuration whilst the retractable roof moves from the retracted configuration to the deployed configuration.

The vehicle may comprise: a third electric motor coupled to the retractable roof to be capable of imparting motion to the retractable roof so that, when the third electric motor is activated, the third electric motor causes the retractable roof to move between the deployed configuration and the retracted configuration; and a fourth electric motor coupled to the moveable cover to be capable of imparting motion to the movable cover so that, when the fourth electric motor is activated, the fourth electric motor causes the moveable cover to move between the closed configuration and the open configuration; wherein the control unit may be configured to control the activation of the third and fourth electric motors so that, during the movement of the retractable roof between the deployed configuration and the retracted configuration, the moveable cover moves partially simultaneously, with the retractable roof, between the closed configuration and open configuration.

The vehicle may comprise: a vehicle body having a first region that is exposed when the retractable roof is in the retracted configuration; a first moveable panel configured to move between a stowed configuration and a deployed configuration, the first moveable panel being attached to the moveable cover so that when the first moveable panel is in the deployed configuration and the moveable cover is in the closed configuration the first moveable panel covers the first region of the vehicle body; and a fifth electric motor coupled to the first moveable panel to be capable of imparting motion to the first moveable panel so that, when the fifth electric motor is activated, the fifth electric motor causes the first moveable panel to move between the stowed configuration and the deployed configuration. The first moveable panel may be attached to the moveable cover so that when the moveable cover is in the stowed configuration and the moveable cover is in the closed configuration the first moveable panel is housed within the housing. The control unit may be configured to control the activation of the fifth electric motor so that, during the movement of the retractable roof between the deployed configuration and the retracted configuration, the first moveable panel moves partially simultaneously, with the retractable roof and/or the moveable cover, between the stowed configuration and the deployed configuration.

The vehicle body may have a second region that is exposed when the retractable roof is in the retracted configuration and the vehicle may comprise: a second moveable panel configured to move between a stowed configuration and a deployed configuration, the moveable panel being attached to the moveable cover so that when the moveable panel is in the deployed configuration and the moveable cover is in the closed configuration the moveable panel covers the second region of the vehicle body; and a sixth electric motor coupled to the second moveable panel to be capable of imparting motion to the second moveable panel so that, when the sixth electric motor is activated, the sixth electric motor causes the moveable panel to move between the stowed configuration and the deployed configuration. The second moveable panel may be attached to the second moveable cover so that when the second moveable cover is in the stowed configuration and the second moveable cover is in the closed configuration the second moveable panel is housed within the housing. The control unit may be configured to control the activation of the sixth electric motor so that, during the movement of the retractable roof between the deployed configuration and the retracted configuration, the second moveable panel moves partially simultaneously, with the retractable roof and/or the moveable cover, between the stowed configuration and the deployed configuration. The first and second moveable panels may be attached to the moveable cover on opposite sides of a longitudinal centreline of the vehicle.

According to a second aspect of the present invention there is provided a vehicle comprising: an occupant cabin; a retractable roof configured to move between a deployed configuration where the roof covers the occupant cabin and a retracted configuration; a housing configured to house the retractable roof when the roof is in the retracted configuration; a moveable cover configured to close the housing and move between a closed configuration where the moveable cover closes the housing and an open configuration to permit the retractable roof to move between the deployed configuration and the retracted configuration; a vehicle body having a first region that is exposed when the retractable roof is in the retracted configuration; a first moveable panel configured to move between a stowed configuration and a deployed configuration, the first moveable panel being attached to the moveable cover so that when the first moveable panel is in the deployed configuration and the moveable cover is in the closed configuration the first moveable panel covers the first region of the vehicle body; and a first electric motor coupled to the first moveable panel to be capable of imparting motion to the first moveable panel so that, when the first electric motor is activated, the first electric motor causes the first moveable panel to move between the stowed configuration and the deployed configuration.

The vehicle body may have a second region that is exposed when the retractable roof is in the retracted configuration and the vehicle may comprise: a second moveable panel configured to move between a stowed configuration and a deployed configuration, the moveable panel being attached to the moveable cover so that when the moveable panel is in the deployed configuration and the moveable cover is in the closed configuration the moveable panel covers the second region of the vehicle body; and a second electric motor coupled to the second moveable panel to be capable of imparting motion to the second moveable panel so that, when the second electric motor is activated, the second electric motor causes the moveable panel to move between the stowed configuration and the deployed configuration.

The present invention will now be described by way of example with reference to the accompanying drawings. In the drawings.

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a vehicle comprising an occupant cabin, a retractable roof configured to move between a deployed configuration where the roof covers the occupant cabin and a retracted configuration, a housing configured to house the retractable roof when the roof is in the retracted configuration and a moveable cover configured to close the housing and move between a closed configuration where the moveable cover closes the housing and an open configuration to permit the retractable roof to move between the deployed configuration and the retracted configuration. The vehicle also comprises a first electric motor coupled to the retractable roof to be capable of imparting motion to the retractable roof so that, when the first electric motor is activated, the first electric motor causes the retractable roof to move between the deployed configuration and the retracted configuration, and a second electric motor coupled to the moveable cover to be capable of imparting motion to the movable cover so that, when the second electric motor is activated, the second electric motor causes the moveable cover to move between the closed configuration and the open configuration. The vehicle also comprises a control unit configured to control the activation of the first and second electric motors so that, during the movement of the retractable roof between the deployed configuration and the retracted configuration, the moveable cover moves partially simultaneously, with the retractable roof, between the closed configuration and open configuration.

Figure 1:
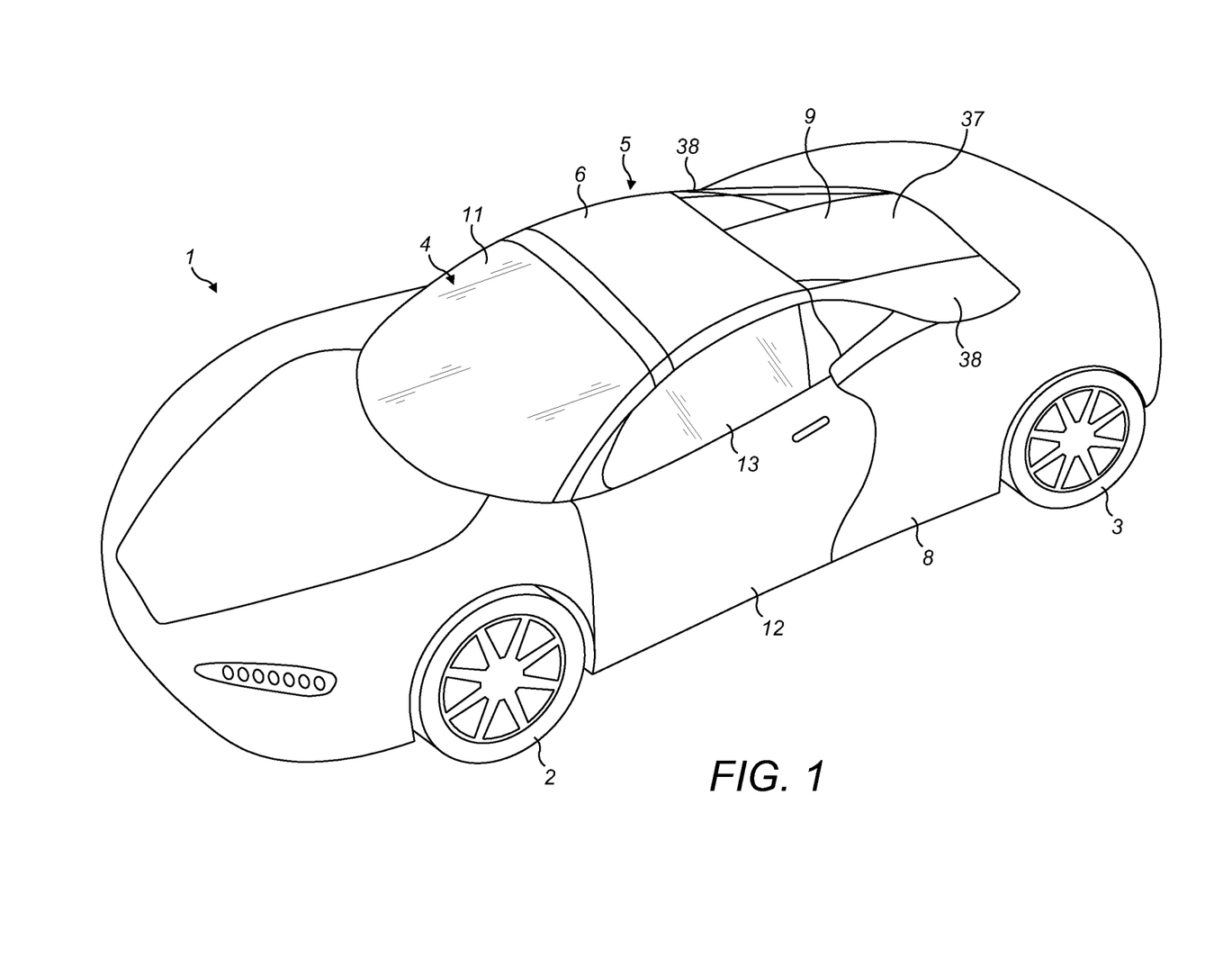
FIG. 1 shows a front three-quarters view of a vehicle comprising a retractable roof in a deployed configuration.
Figure 2:
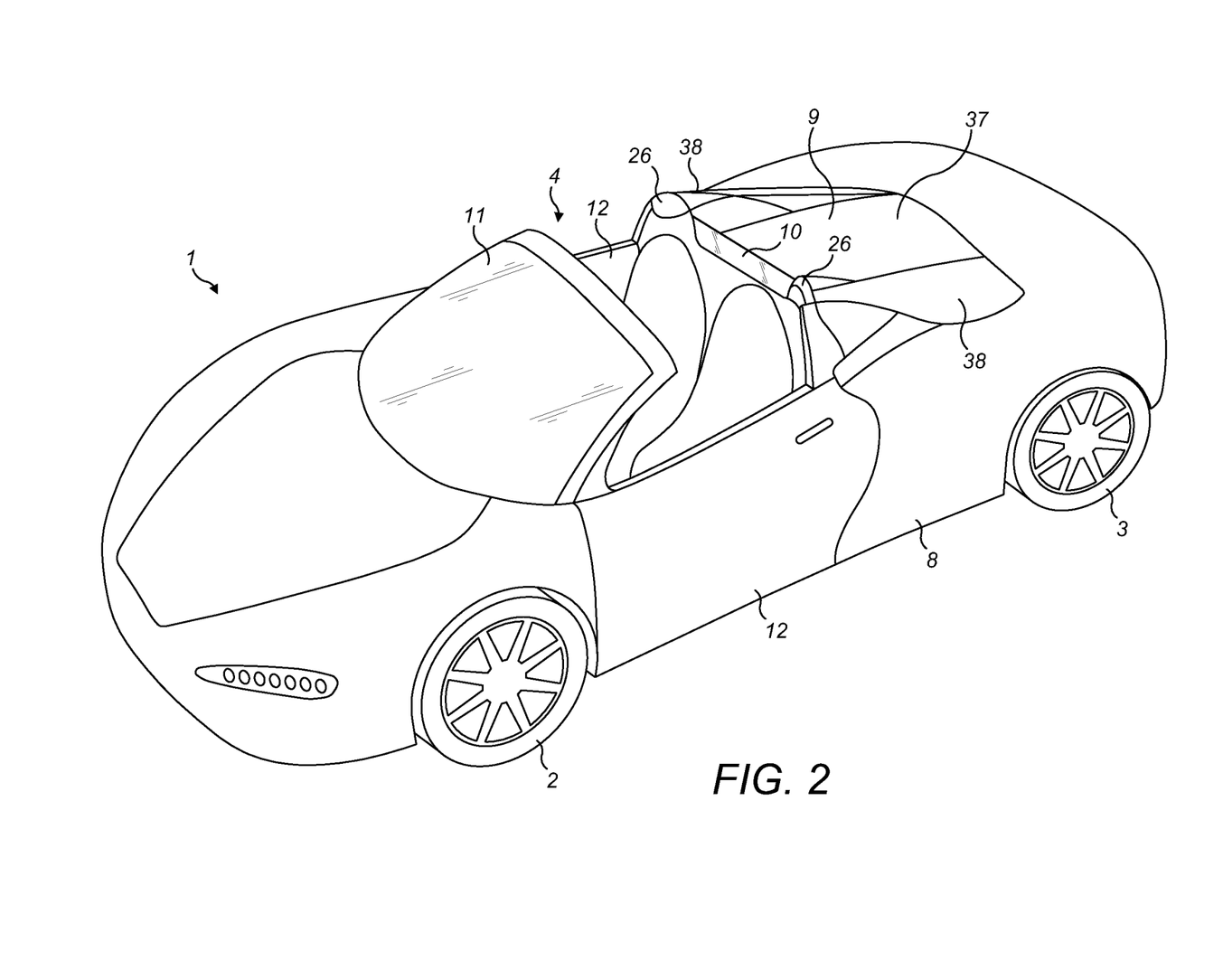
FIG. 2 shows a front three-quarters view of the vehicle comprising the retractable roof in a retracted configuration.

FIG. 1 shows a vehicle 1 having a retractable roof shown in its deployed configuration. FIG. 2 shows a vehicle 1 having the retractable roof shown in its retracted configuration. The vehicle 1 may be a car. The vehicle 1 may be a road vehicle. The vehicle 1 comprises front wheels 2 and rear wheels 3. The front of the vehicle 1 is defined with reference to the primary motion direction of the vehicle 1. The front of the vehicle 1 points in the primary motion direction of the vehicle. Generally, a vehicle has a primary motion direction that is the forward direction. The vehicle 1 comprises an occupant cabin 4. The occupant cabin 4 may comprise one or more seats for occupants of the vehicle to sit in. As shown in FIG. 2, the vehicle 1 comprises two seats. The vehicle 1 may comprise a single row of seats as shown in FIGS. 1 and 2. The vehicle 1 may comprise controls located within the occupant cabin 4 to enable an occupant to control the motion of the vehicle.

The vehicle 1 comprises a retractable roof 5. The retractable roof 5 is configured to move between a deployed configuration as shown in FIG. 1 and a retracted configuration as shown in FIG. 2. The retractable roof 5 may be a hard-top retractable roof 5 as shown in FIG. 1. The retractable roof 5 shown in FIG. 1 comprises a single roof element 6 that is moveable between a deployed configuration where the roof element 5 covers the occupant cabin 4 and a retracted configuration where the roof element 5 does not cover the occupant cabin 4. The retractable roof 5 may comprise multiple roof elements that together form the roof of the vehicle. These roof elements may be positioned next to one another to form the roof of the vehicle. The number and configuration of the roof elements is dependent on the size and shape of the occupant cabin 4 that needs to be covered by the retractable roof 5. The movement of the retractable roof 5 is controlled by one or more electric motors that are coupled to the retractable roof 5 to permit movement of the roof elements between the deployed configuration and the retracted configuration. The vehicle may comprise two roof electric motors each of which is coupled to the retractable roof 5 on opposite sides of the vehicle 1. The electric motors are coupled to the retractable roof by one or more linkages. The hard-top retractable roof may comprise all rigid roof members or may comprise some flexible roof members together with rigid roof members. The hard-top retractable roof may comprise at least one pane of glass that is housed within a roof panel.

Alternatively, the retractable roof 5 may be a soft-top retractable roof. The retractable roof may comprise one or more flexible roof members that are supported by a frame. The frame may be moveable to permit the retractable roof to move between the deployed configuration and the retracted configuration. The frame may be coupled to the electric motor(s) to permit movement of the frame and thus the retractable roof.

FIG. 2 shows the vehicle 1 having a retractable roof 5 shown in its retracted configuration. As shown in FIGS. 3 to 6, the vehicle comprises a housing 7 that is configured to house the retractable roof when the roof is in the retracted configuration. The housing 7 is located within the vehicle body 8 and beneath moveable cover 9. The housing 7 may be a discrete housing and/or may be formed from body panels of the vehicle body 8 that also serve another purpose. For instance, covering an engine bay. FIG. 4 shows the retractable roof in its retracted configuration within the housing 7. The housing 7 may be shaped to receive the retractable roof. The housing 7 may be sized so as to accommodate the retractable roof element(s) together with the associated linkages and electric motors.

The vehicle 1 comprises a moveable cover 9. The moveable cover 9 may be known as a tonnaeu cover. The moveable cover 9 may extend generally horizontally when in its closed configuration as shown in FIGS. 1, 2, 3 and 4. The moveable cover 9 closes the housing 7 so that when the retractable roof 5 is in the retracted configuration the retractable roof 5 is enclosed in a space defined by the housing 7 and the underside of the movable cover 9. The moveable cover 9 may comprise seals to seal the moveable cover 9 to other body panels of the vehicle body 8 and/or to the housing 7.

The vehicle 1 comprises a rear window 10. The rear window 10 may be configured to move along a direction generally defined by the plane of the rear window 10. The rear window 10 can move between a retracted position where it is either fully or partially housed within the vehicle body and a deployed position where it projects from the vehicle body and, if the roof 5 is in the deployed position, seals against the rear edge of the roof panel(s) 5. The movement of the window 10 can assist in the movement of the retractable roof 5 between the deployed configuration and the retracted configuration. The window 9 may partially or fully retract into the vehicle body whilst and/or during the movement of the retractable roof 5.

The vehicle 1 also comprises a windscreen 11 through which the occupants of the vehicle 1 can look to see out of the vehicle 1. The windscreen 11 is located forward of the occupant cabin 4. The vehicle comprises two doors 12, one to each side of the vehicle 5. The doors 12 open to permit the occupants to enter and exit the vehicle. The doors each comprise a door glass 13 through which the occupants of the vehicle 1 can look to see out of the vehicle 1. Each door glass 13 is moveable between a retracted position and a deployed position. It will be appreciated that the vehicle 1 may comprise more than two doors depending on the seat configuration of the occupant cabin 4.

Figure 3:
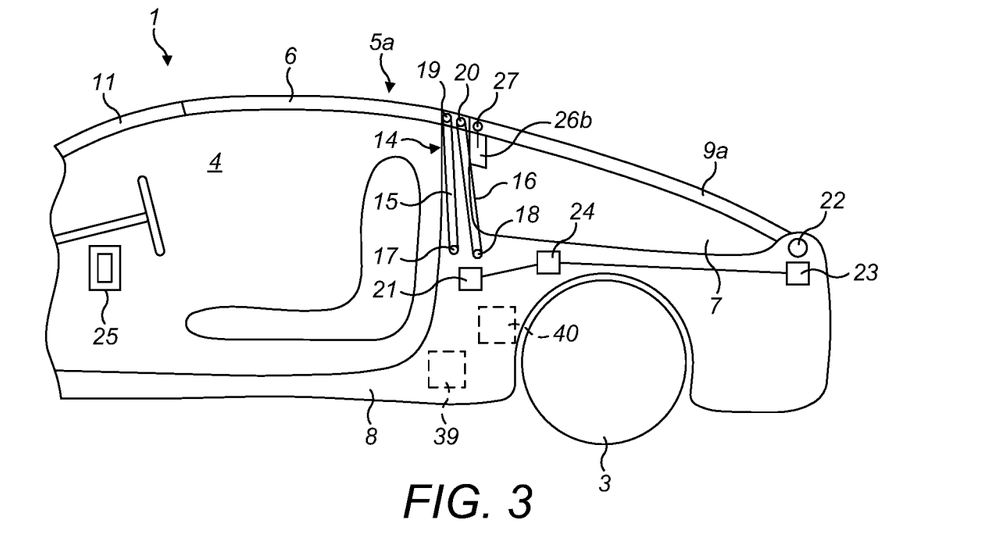
FIG. 3 shows a schematic side view of the vehicle showing the retractable roof in a deployed configuration and a moveable cover in a closed configuration.
Figure 4:
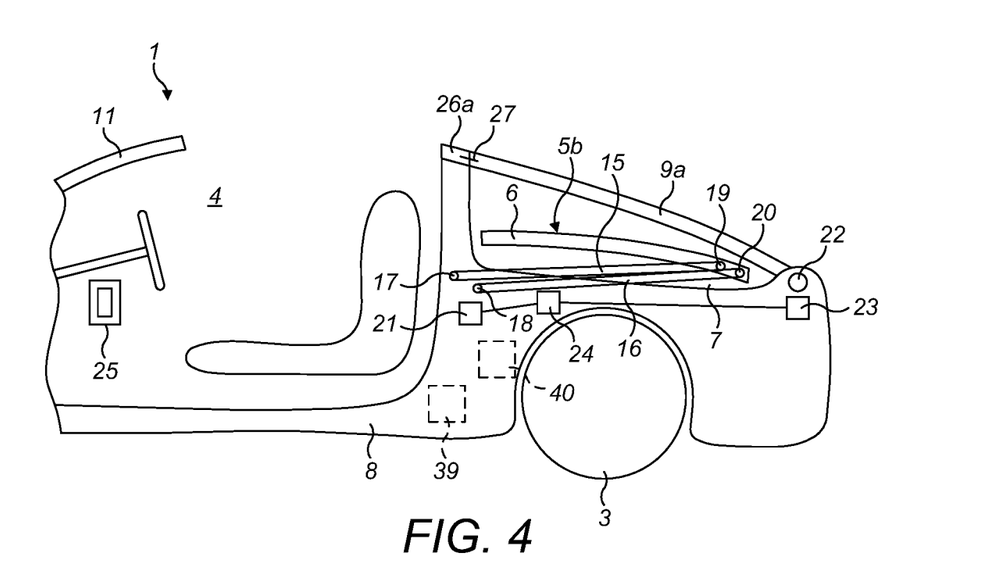
FIG. 4 shows a schematic side view of the vehicle showing the retractable roof in a retracted configuration and the moveable cover in a closed configuration.
Figure 5:
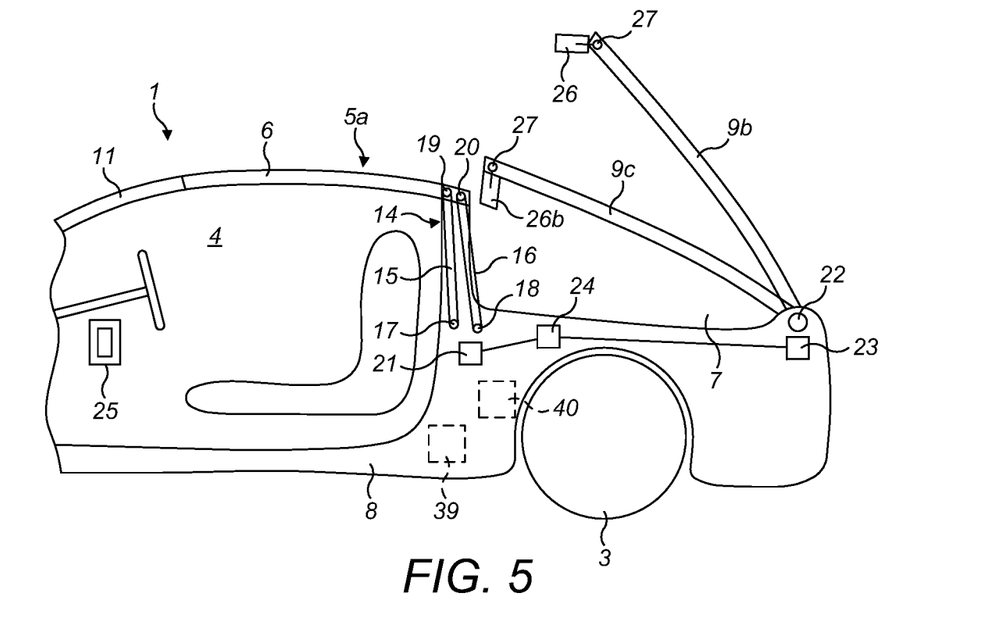
FIG. 5 shows a schematic side view of the vehicle showing the retractable roof in a retracted configuration and the moveable cover in two configurations: an intermediate configuration and an open configuration.

FIGS. 3 to 6 show schematic side views of the vehicle 1 with the retractable roof 5 and the moveable cover 9 in various configurations. It will be appreciated that the side views show a cut through view of the moveable cover 9 and so show only part of the profile of the moveable cover 9 in the lateral direction of the vehicle 1. As can be seen from FIGS. 1 and 2, the moveable cover 9 has is shaped to conform with the shape of adjacent body panels and vehicle components. FIG. 3 shows the vehicle 1 with the retractable roof 5 in the deployed configuration 5a and the moveable cover 9 in the closed configuration 9a. FIG. 4 shows the vehicle 1 with the retractable roof 5 in the retracted configuration 5b and the moveable cover 9 in the closed configuration 9a. FIG. 5 shows the vehicle 1 with the retractable roof 5 in the deployed configuration 5a and the moveable cover 9 in two configurations: an open configuration 9b and an intermediate configuration 9c where the position of the moveable cover 9 is between the closed configuration 9a and the open configuration 9c. FIG. 5 shows the vehicle 1 with the retractable roof 5 in an intermediate configuration 5c where the position of the retractable roof 5 is between the deployed configuration 5a and the closed configuration 5b and the moveable cover 9 in the open configuration 9b.

As discussed herein, the retractable roof 5 shown in the figures comprises a single roof element 6 but may instead comprise multiple roof elements that together form the roof of the vehicle. The roof element(s) are mounted to the body 8 of the vehicle 1 on a mechanism shown generally at 14. The mechanism 14 permits the roof element(s) to move between the deployed configuration 5a and the retracted configuration 5b. The mechanism may take any suitable form. It may define any convenient combination of rotation and translation to cause the roof to move between the deployed configuration 5a and retracted configuration 5b.

In the example of FIGS. 3 to 6, the mechanism comprises a multi-bar linkage. On each side of the vehicle a pair of swing arms extend between the vehicle body and the roof. The swing arms 15, 16 and their associated parts on only one side of the vehicle are labelled in FIGS. 3 to 6. The swing arm mechanism on the other side of the vehicle is a mirror image. The swing arms are attached to the vehicle body by respective revolute joints 17, 18 and to the roof by revolute joints 19, 20. When the roof is retracted towards its stowed position, the swing arms rotate rearwardly about joints 17, 18. The swing arms may define a parallelogram linkage, so that the attitude of the roof as it retracts remains substantially constant.

Motion of the swing arms may be driven by an electric motor 21 coupled at one of the joints 17, 18. Thus, an electric motor 21 may be coupled to the retractable roof 5 to be capable of imparting motion to the retractable roof 5 so that, when the electric motor is activated, the electric motor causes the tractable roof to move between the deployed configuration and the retracted configuration. The roof mechanism 14 to one side of the vehicle may be driven by a first electric motor 21 and the roof mechanism 14 to the other side of the vehicle may be driven by a second electric motor 21. The motion of the first and second electric motors are be synchronised so that the two sides of the retractable roof 5 move in unison.

The mechanism by which the roof is mounted to the vehicle body may be such that the top surface of the roof remains upwards throughout the retraction operation. In other words, the roof might not be inverted during the retraction operation. When the underside of the roof is concave, this can result in that concavity facing downwards when the roof is stowed.

Figure 6:
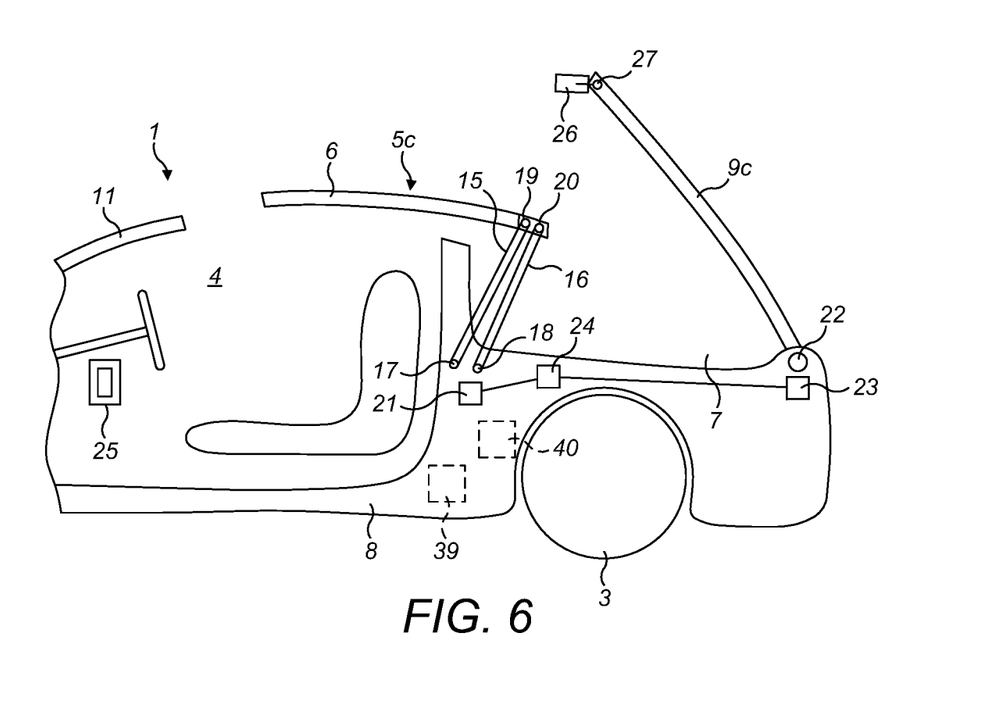
FIG. 6 shows a schematic side view of the vehicle showing the retractable roof in an intermediate configuration and the moveable cover in an open configuration.

The moveable cover 9 is mounted to the body 8 of the vehicle 1 by a mechanism which permits the moveable cover 9 to be raised to the open configuration as shown in FIGS. 5 and 6. This mechanism may take any convenient form. In the example of the figures, the moveable cover 9 is mounted to the vehicle body by a pair of revolute joints 22 located to each side of the vehicle 1 at the rear of the moveable cover 9. The motion of the moveable cover may be driven by an electric motor 23. The motor 23 may be coupled to joints 22. Alternatively, the vehicle may comprise a third electric motor 23 and a fourth electric motor 23 and the motion of each side of the moveable cover 9 may be driven by a respective one of the third and fourth electric motors. The electric motor(s) may be coupled to the moveable cover at joint(s) 22. The electric motor(s) can be activated to raise the moveable cover 9 (i.e. to cause it to move from the closed configuration 9a to the open configuration 9b) or to lower the moveable cover 9 (i.e. to cause it to move from the open configuration 9b to the closed configuration 9a). Thus, an electric motor 23 may be coupled to the moveable cover 9 to be capable of imparting motion to the moveable cover 9 so that, when the electric motor 23 is activated, the electric motor 23 causes the moveable cover 9 to move between the closed configuration 9a and the open configuration 9b. There may be no mechanical connection between the mechanism that mounts the retractable roof to the body and the mechanism that mounts the moveable cover to the body so that the mechanisms can move separately.

The electric motors used for the motion of the retractable roof 5 and moveable cover 9 may be controlled by a control unit 24. The control unit 24 is configured to control the activation of the electric motors. The control unit 24 may be configured to supply power to the electric motors to activate them. This power may directly activate the electric motors, or alternatively the power may cause a motor control unit to supply power to the electric motor to activate it. The control unit 24 may also control the motion of rear window 10 during the retracting or deploying of the retractable roof 5. The control unit 24 may be a discrete control unit or may be formed as part of another vehicle control unit that has other functions.

The use of electric motors to impart motion to the retractable roof 5 and the moveable cover 9 means that the motion of the retractable roof 5 and moveable cover 9 can be controlled separately. This means that both the retractable roof 5 and the moveable cover 9 can move at least partially simultaneously during the movement of the retractable roof 5 between the two configurations of the deployed configuration and the retracted configuration. This is advantageous because it can shorten the opening and closing time of the retractable roof because the two main components of the roof retractable roof (the roof itself and the moveable cover) can move at the same time for at least part of the motion of the retractable roof. The motion of the roof 5 and moveable cover 9 between the roof being deployed and retracted will now be explained with reference to FIGS. 3 to 6. The control unit 24 being configured to control the motion of the roof and moveable cover in the way herein described.

FIG. 3 shows the retractable roof 5 in the deployed configuration 5a and the moveable cover 9a in the closed configuration. The vehicle 1 may comprise one or more switches 25 for controlling the activation of the movement of the retractable roof 5 between the two configurations: the deployed configuration and the retracted configuration. The control unit 24 may be responsive to these switches in the vehicle's cabin. The switches could in general be any user-actuable control devices.

When an occupant of the vehicle triggers switch 25 the control unit may cause the retractable roof to move from the deployed configuration 5a to the retracted configuration 5b. As the moveable cover 9 is in the closed configuration and so covers the housing 7, the moveable cover 9 needs to start to move before the retractable roof 5 does. Also, the moveable cover 9 contacts the rear edge of roof element 6 and so again needs to start to move before the retractable roof 5 is able to. Thus, the moveable cover 9 moves from the closed configuration 9a towards the open configuration 9b. When the moveable cover 9 has moved to a first intermediate configuration 9c (an example of which is shown in FIG. 5), the retractable roof 5 is now capable of moving from the deployed configuration towards the retracted configuration. This is because the moveable cover 9 has moved to a first intermediate configuration 9c which means that:

The moveable cover 9 is no longer in contact with the retractable roof 5 and in particular the rear edge of roof element 6.

A movement of the retractable roof 5 from the deployed configuration means that the retractable roof 5 would not cause the retractable roof 5 to come into contact with the moveable cover 9. This is because the front edge of the moveable cover 9 has moved away from the retractable roof 5. This movement gives a clearance gap between the front edge of the moveable cover 9 and the retractable roof 5.

The first intermediate configuration 9c moved to by the moveable cover 9 may be 10%, 15%, 20%, 25%, 30%, or 35% of the motion range of the moveable cover 9 between the closed configuration and the open configuration from the closed configuration.

As the retractable roof 5 starts to move towards the retracted configuration 5b, the moveable cover continues to move towards the open configuration 9b to provide sufficient clearance to the retractable roof 5 to move into the housing 7. Thus, during this portion of the movement of the retractable roof 5 between the deployed configuration 5a and the retracted configuration 5b the retractable roof 5 moves simultaneously with the moveable cover 9. The moveable cover 9 will then reach the open configuration 9b whilst the retractable roof 5 continues to move towards the retracted configuration 5b.

It may be that only during part of the motion of the retractable roof 5 towards the retracted configuration 5b that the moveable cover 9 needs to remain in the open configuration. Thus, once the retractable roof 5 reaches a second intermediate configuration 5c (an example of which is shown in FIG. 6) the moveable cover 9 starts to move back towards the closed configuration 9a from the open configuration 9b. The second intermediate configuration means that:

The retractable roof 5 has moved sufficiently towards the retracted configuration that a movement by the moveable cover 9 towards the closed configuration would not cause contact between the retractable roof 5 and the moveable cover 9.

The region vacated by the moveable cover 9 is sufficiently sized that the retractable roof 5 can continue to move towards the retracted configuration without coming into contact with the moveable cover 9.

The second intermediate configuration 5c moved to by the retractable roof 5 may be 35%, 40%, 45%, 50%, 55%, 60%, or 65% of the motion range of the retractable roof 5 between the deployed configuration to the retracted configuration from the deployed configuration.

Once again, during this portion of the movement of the retractable roof 5 between the deployed configuration 5a and the retracted configuration 5b the retractable roof 5 moves simultaneously with the moveable cover 9. The retractable roof 5 will then reach the retracted position 5b being housed within the housing 7 and the moveable cover 9 will then (potentially subsequently) reach the closed position 9b closing the housing 7 with the retractable roof 5 within the housing 7 as shown in FIG. 4.

At another time, the occupant of the vehicle may trigger switch 25 to cause the control unit to cause the retractable roof 5 to move from the retracted configuration 5b to the deployed configuration 5a. As the moveable cover 9 is in the closed configuration and so covers the housing 7 with the retractable roof 5 inside, the moveable cover 9 needs to start to move before the retractable roof 5 does. Thus, the moveable cover 9 moves from the closed configuration 9a towards the open configuration 9b. When the moveable cover 9 has moved to a third intermediate configuration 9c (which may be different to or the same as the first intermediate configuration 9c), the retractable roof 5 is now capable of moving from the retracted configuration to the deployed configuration. The third intermediate configuration 9c may be different to the first intermediate configuration 9c because of the different conditions required for the retractable roof to start moving from the retracted configuration 5b as opposed to the deployed configuration 5a. The third intermediate configuration 9c means that:

The moveable cover 9 has moved sufficiently from the closed configuration that a movement of the retractable roof 5 from the retracted configuration 5b would not cause contact between the retractable roof 5 and the moveable cover 9.

The third intermediate configuration moved to by the moveable cover 9 may be 25%, 30%, 35%, 40%, 45%, or 50% of the motion range of the moveable cover 9 between the closed configuration and the open configuration from the closed configuration.

As the retractable roof 5 starts to move towards the deployed configuration 5a, the moveable cover 9 continues to move towards the open configuration 9b to provide sufficient clearance to the retractable roof 5 to move out of the housing 7. Thus, during this portion of the movement of the retractable roof 5 between the retracted configuration 5b and the deployed configuration 5a the retractable roof 5 moves simultaneously with the moveable cover 9. The moveable cover 9 will then reach the open configuration 9b whilst the tractable roof 5 continues to move towards the deployed configuration 5a.

Again, it may be that only during part of the motion of the retractable roof 5 towards the deployed configuration 5a that the moveable cover 9 needs to remain in the open configuration. Thus, once the retractable roof 5 reaches a fourth intermediate configuration 5c (which may be different to or the same as the second intermediate configuration 5c), the moveable cover 9 starts to move back towards the closed configuration 9a from the open configuration 9b. The fourth intermediate configuration means that:

The retractable roof 5 have moved sufficiently towards the deployed configuration that a movement by the moveable cover 9 towards the closed configuration would not cause contact between the retractable roof 5 and the moveable cover 9.

The motion of the retractable roof 5 towards the deployed configuration means that the retractable roof 5 will clear the front edge of the moveable cover 9 as the moveable cover 9 moves towards the closed configuration 9a.

The fourth intermediate configuration 5c moved to by the retractable roof 5 may be 35%, 40%, 45%, 50%, 55%, 60%, or 65% of the motion range of the retractable roof 5 between the deployed configuration to the retracted configuration from the retracted configuration.

Once again, during this portion of the movement of the tractable roof 5 between the retracted configuration 5b and the deployed configuration 5a the retractable roof 5 moves simultaneously with the moveable cover 9. The retractable roof 5 will then reach the deployed position 5a covering the occupant cabin 4 and the moveable cover 9 will then reach the closed position 9b closing the housing 7 as shown in FIG. 3. The retractable roof 5 will reach the deployed position 5a prior to the moveable cover 9 reaching the closed position 9b so that the moveable cover 9 can be positioned behind the rear edge of the roof element 6.

As will be seen from the above, the synchronous movement of the retractable roof and the moveable cover over parts of the motion of the retractable roof means that the motion of the retractable roof does not need to wait until the moveable cover has completed its own motion. This means that the cycle time between configurations of the retractable roof can be reduced.

There are regions of the body 8 of the vehicle 1 that are covered by the retractable roof 5 when the retractable roof 5 is in the deployed configuration 5a. When the retractable roof 5 moves to the retracted configuration 5b certain regions of the vehicle body 8 may be exposed that it would be preferential to have covered. Examples of such regions may be directly in front of the moveable cover 9. As shown in FIG. 1, the retractable roof 5 covers a region of the vehicle body above and inboard of the B-pillar. The B-pillar being the pillar of the vehicle body behind the side window of the vehicle. As shown in FIG. 2, these regions are covered by moveable panels 26.

The moveable panels 26 are attached to moveable cover 9. The moveable panels 26 are mounted to the moveable cover 9 by a mechanism which permits the moveable panels 26 to move between a deployed configuration 26a and a stowed configuration 26b. In the example of the figures, the moveable panels 26 are each mounted to the moveable cover 9 by a revolute joint 27. The motion of the moveable panels 26 may be driven by a respective electric motor. Alternatively, the moveable panels 26 could be driven by one electric motor. The motor may be coupled to the joint 27. The vehicle may comprise two moveable panels 26 mounted to the moveable cover on opposite sides of the vehicle 1. The moveable panels 26 may each be aligned with the region of the vehicle through which respective retractable roof mechanisms 14 pass on opposite sides of the vehicle 1.

The moveable cover 9 may be shaped to provide a continuous surface to the vehicle body 8 with other body panels located adjacent to the moveable cover 9. The moveable cover 9 comprises a cover body 37. The cover body 37 forms the base of the moveable cover 9. The cover body 37 forms the deck of the vehicle body 8 behind the rear of the retractable roof 5. Beneath the cover body 37 is the housing 7 for the retractable roof 5. The moveable cover 9 also comprises two fins 38. The fins 38 each extend from the cover body 37. The fins 38 each project from the cover body 37. The fins 38 project in a direction generally perpendicular to the cover body 37. In this way, the fins 38 project in a generally vertical direction. The fins 38 are located on either side of a longitudinal centreline of the vehicle 1. The fins 38 may each be aligned with the region of the vehicle through which respective retractable roof mechanisms 14 pass on opposite sides of the vehicle 1. The moveable panels 26 may each be mounted to a respective fin 38 of the moveable cover 9.

As shown in FIG. 3, the moveable panels 26 are in the stowed configuration 26b when the retractable roof 5 is in the deployed configuration 5a and the moveable cover 9 is in the closed configuration 9a. This means that they are not visible when the retractable roof 5 is in the deployed configuration 5a. During the motion of the retractable roof 5 from the deployed configuration 5a to the retracted configuration 5b the moveable panels 26 move from the stowed configuration 26b to the deployed configuration 26a. During the motion of the retractable roof 5 from the retracted configuration 5b to the deployed configuration 5a the moveable panels 26 move from the deployed configuration 26a to the stowed configuration 26b. As shown in FIG. 5, the moveable panels 26 move between the two configurations whilst the moveable cover 9 is in positions between the closed position and the open position. The moveable panels 26 move at least partially simultaneously with the moveable cover 9.

Figure 7:
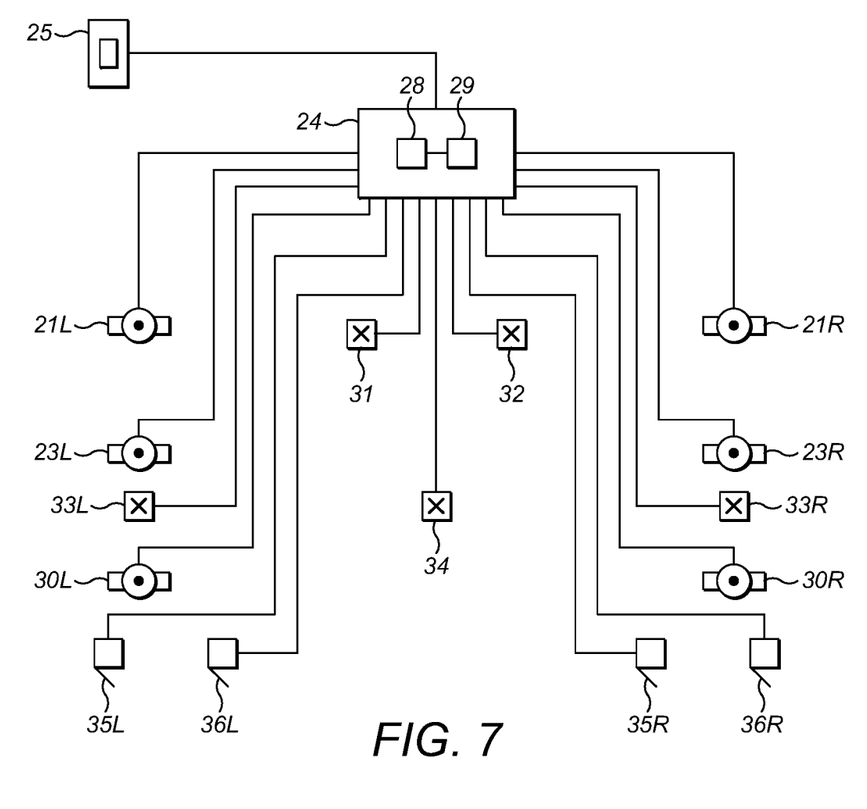
FIG. 7 shows a schematic plan of a control unit and connected electric motors and sensors.

FIG. 7 shows a schematic diagram of the control unit 24 and associated components. The control unit 24 may comprise a processor 28 and a non-volatile memory 29. The control unit may be formed as part of a more general vehicle control unit. The control unit 24 may comprise more than one processor and more than one memory. The memory stores a set of program instructions that are executable by the processor, and reference data such as look-up tables that can be referenced by the processor in response to those instructions. The processor maybe configured to operate in accordance with a computer program stored in non-transitory form on a machine readable storage medium. The computer program may store instructions for causing the processor to perform the electric motor control operations in the manner described herein.

The control unit 24 is connected to switch 25 to receive a roof control signal from the switch 25. The roof control signal indicating whether the roof is to move between the two configurations of the deployed configuration and the retracted configuration.

The control unit 24 is connected to first and second electric motors 21L, 21R that provide motion to the retractable roof 5. The first and second electric motors 21L, 21R provide motion to respective mechanisms 14, of the retractable roof 5, located on opposite sides of the vehicle 1. The control unit 24 is configured to control the activation of the first and second electric motors 21L, 21R to move the retractable roof 5 between its two configurations: the deployed configuration and the retracted configuration. The control unit 24 is connected to two roof sensors 31, 32. The first roof sensor 31 provides a roof closed signal to the control unit 24 which indicates when the retractable roof 5 has reached the deployed configuration. The control unit 24 may stop the activation of the first and second electric motors in response to the roof closed signal. The second roof sensor 32 provides a roof open signal to the control unit 24 which indicates when the retractable roof 5 has reached the retracted configuration. The control unit 24 may stop the activation of the first and second electric motors in response to the roof open signal. The first and second roof sensors 31, 32 are positioned within the vehicle so that they can detect the position of the retractable roof at its end points. For instance, the first roof sensor may be located in the windscreen surround where the windscreen surround meets the retractable roof and the second roof sensors may be located within the housing 7. The first and second roof sensors may be hall sensors.

The control unit 24 is connected to third and fourth electric motors 23L, 23R that provide motion to the moveable cover 9. The third and fourth electric motors 23L, 23R provide motion to respective mechanisms 22, of the moveable cover 9, located on opposite sides of the vehicle 1. The control unit 24 is configured to control the activation of the third and fourth electric motors 23L, 23R to move the moveable cover 9 between its two configurations: the closed configuration and the open configuration. The control unit is connected to at least two cover sensors 33L, 33R, 34. The first cover sensor(s) provide a cover closed signal. There may be first and second cover sensors that provide cover closed signals. The first and second cover sensors are located on each side of the vehicle and detect whether the left and right sides of the movable cover 9 are latched in the closed position respectively. The control unit 23 may stop the activation of the third and fourth electric motors 23L, 23P in response to the cover closed signal or in response to receiving both cover closed signals as appropriate. The third cover sensor 34 provides a cover open signal. The cover open signal may indicate that the movable cover 9 has reached the open configuration. The control unit 24 may stop the activation of the third and fourth electric motors in response to the cover open signal. The first, second and third cover sensors are positioned so that they can detect the position of the moveable cover at its end points. The first, second and third cover sensors may be hall sensors.

The control unit 24 is connected to fifth and sixth electric motors 30L, 30R that provide motion to the moveable panels 26. The fifth and sixth electric motors 30L, 30R provide motion to respective mechanisms 27, of the moveable panels 26, located on opposite sides of the vehicle 1. The control unit 24 is configured to control the activation of the fifth and sixth electric motors 30L, 30R to move the moveable cover 9 between its two configurations: the deployed configuration and stowed configuration. The control unit is connected to a respective pair of movable panel sensors 35L, 36L, 35R, 36R for each movable panel 26. The first movable panel sensor 35L provides a panel deployed signal indicating that the respective moveable panel has reached the deployed configuration. The second movable panel sensor 35R provides a panel stowed signal indicating that the respective moveable panel has reached the stowed configuration. The control unit 24 may stop the activation of the respective fifth and sixth electric motor in response to receiving the relevant panel deployed signal and/or panel stowed signal. The moveable panel sensors are positioned to be able to detect the end points of the moveable panels. The moveable panel sensors may be microswitches.

The electric motors may each be configured to output a motor motion signal. The motor motion signal indicates the amount of motion imparted by the electric motor. The control unit receives the motor motion signals and determines the amount of motion imparted to the retractable roof, moveable cover and/or moveable panels as appropriate. The electric motors may impart a rotational motion on a shaft that is coupled to the retractable roof, moveable cover or moveable panel to move the respective component. The motor motion signal may indicate when a full rotation of the shaft has been completed. The control unit can derive from the full rotation indication an amount of motion that will have been imparted to the retractable roof, moveable cover or moveable panel. The control unit may count the number of full rotations from an end point of motion of the retractable roof, moveable cover and/or moveable panels such as the retracted configuration or open configuration. As the kinematics of the mechanism by which the retractable roof, moveable cover and/or moveable panels are moved is known, the control unit can be configured to derive the position of the retractable roof, moveable cover and/or moveable panels from the motor motion signals. Thus, the control unit can calculate the current position of the retractable roof, moveable cover and/or moveable panels from the motor motion signals. The control unit can therefore control the activation of the electric motors in dependence on the motor motion signals to permit the retractable roof, moveable cover and/or moveable panels to move at least partially simultaneously.

In some cases, the electric motor may not output a motor motion signal. For instance, the fifth and sixth electric motors 30L, 30R that provide motion to the moveable panels 26 may not output a motor motion signal. In this case, the control unit 24 may detect the position of the moveable panels only at their end points using the first and second movable panel sensors 35L and 35R. The control unit 24 may activate the electric motors to run in a selected direction and deactivate the electric motors in response to the signal being received from the moveable panel sensors 35L and 35R.

An engine 39 and/or a gearbox 40 of the vehicle may be located below the housing 7. The engine 39 may comprise an internal combustion engine, an electric motor or any combination of the two. The engine 39 may be located behind the occupant cabin 4. The vehicle 1 may be a mid-engined or rear-engined vehicle.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A vehicle comprising:
   an occupant cabin;
   a retractable roof configured to move between a deployed configuration where the roof covers the occupant cabin and a retracted configuration;
   a housing configured to house the retractable roof when the roof is in the retracted configuration;
   a moveable cover configured to close the housing and move between a closed configuration where the moveable cover closes the housing and an open configuration to permit the retractable roof to move between the deployed configuration and the retracted configuration;
   a first electric motor and a second electric motor coupled to the retractable roof to be capable of imparting motion to the retractable roof separately to the moveable cover so that, when the first electric motor and the second electric motor are activated, the first electric motor and the second electric motor cause the retractable roof to move between the deployed configuration and the retracted configuration;
   a third electric motor and a fourth electric motor coupled to the moveable cover to be capable of imparting motion to the moveable cover separately to the moveable cover so that, when the third electric motor and the fourth electric motor are activated, the third electric motor and the fourth electric motor cause the moveable cover to move between the closed configuration and the open configuration; and
   a control unit configured to control the activation of the first, second, third and fourth electric motors so that, during the movement of the retractable roof between the deployed configuration and the retracted configuration, the moveable cover moves partially simultaneously, with the retractable roof, between the closed configuration and open configuration.

2. A vehicle according to claim 1, wherein the first electric motor is configured to output a first motor motion signal indicating an amount of motion imparted by the first electric motor, the second electric motor is configured to output a second motor motion signal indicating an amount of motion imparted by the second electric motor, the third electric motor is configured to output a third motor motion signal indicating an amount of motion imparted by the third electric motor, the fourth electric motor is configured to output a fourth motor motion signal indicating an amount of motion imparted by the fourth electric motor, and the control unit is configured to: receive the first, second, third and fourth motor motion signals, and control the activation of the first, second, third and fourth electric motors in dependence on the first, second, third and fourth motor motion signals.

3. A vehicle according to claim 2, wherein the first and second electric motors impart a rotational motion on a first shaft and the first and second motor motion signals indicate the amount of motion imparted on the first shaft.

4. A vehicle according to claim 3, wherein the first and second motor motion signals indicates when a full revolution of the first shaft has been completed.

5. A vehicle according to claim 2, wherein the third and fourth electric motors impart a rotational motion on a second shaft and the third and fourth motor motion signals indicate the amount of motion imparted on the second shaft.

6. A vehicle according to claim 5, wherein the third and fourth motor motion signals indicate when a full revolution of the second shaft has been completed.

7. A vehicle according to claim 4, wherein the control unit is configured to control the activation of the first, second, third and fourth electric motors in dependence on the number of full revolutions completed by the first shaft.

8. A vehicle according to claim 1, wherein the control unit is configured to control the activation of the first, second, third and fourth electric motors so that during the movement of the retractable roof from the deployed configuration to the retracted configuration:
   the moveable cover moves from the closed configuration to a first intermediate configuration positioned between the closed configuration and the open configuration whilst the retractable roof remains stationary; and
   the moveable cover moves from the first intermediate configuration to the open configuration whilst the retractable roof moves from the deployed configuration to a second intermediate configuration positioned between the deployed configuration and the retracted configuration.

9. A vehicle according to claim 8, wherein the control unit is configured to control the activation of the first, second, third and fourth electric motors so that during the movement of the retractable roof from the deployed configuration to the retracted configuration:
   the moveable cover moves from the open configuration to the closed configuration at least partially simultaneously with the retractable roof moving from the second intermediate configuration to the retracted configuration.

10. A vehicle according to claim 9, wherein the control unit is configured to control the activation of the first, second, third and fourth electric motors so that during the movement of the retractable roof from the deployed configuration to the retracted configuration:
    the moveable cover moves from the open configuration to the closed configuration whilst the retractable roof moves from the second intermediate configuration to the retracted configuration.

11. A vehicle according to claim 1, wherein the control unit is configured to control the activation of the first, second, third and fourth electric motors so that during the movement of the retractable roof from the deployed configuration to the retracted configuration:
    the moveable cover moves from the closed configuration to a first intermediate configuration positioned between the closed configuration and the open configuration whilst the retractable roof remains stationary; and the moveable cover moves from the first intermediate configuration to the open configuration whilst the retractable roof moves from the deployed configuration to the retracted configuration.

12. A vehicle according to claim 1, wherein the control unit is configured to control the activation of the first, second, third and fourth electric motors so that during the movement of the retractable roof from the retracted configuration to the deployed configuration:

the moveable cover moves from the closed configuration to a first intermediate configuration positioned between the closed configuration and the open configuration whilst the retractable roof remains stationary; and the moveable cover moves from the first intermediate configuration to the open configuration whilst the retractable roof moves from the retracted configuration to a second intermediate configuration positioned between the retracted configuration and the deployed configuration.

13. A vehicle according to claim 12, wherein the control unit is configured to control the activation of the first, second, third and fourth electric motors so that during the movement of the retractable roof from the retracted configuration to the deployed configuration:

the moveable cover moves from the open configuration to the closed configuration at least partially simultaneously with the retractable roof moving from the second intermediate configuration to the deployed configuration.

14. A vehicle according to claim 13, wherein the control unit is configured to control the activation of the first, second, third and fourth electric motors so that during the movement of the retractable roof from the retracted configuration to the deployed configuration:

the moveable cover moves from the open configuration to the closed configuration whilst the retractable roof moves from the second intermediate configuration to the deployed configuration.

15. A vehicle according to claim 1, wherein the control unit is configured to control the activation of the first, second, third and fourth electric motors so that during the movement of the retractable roof from the retracted configuration to the deployed configuration:

the moveable cover moves from the closed configuration to a first intermediate configuration positioned between the closed configuration and the open configuration whilst the retractable roof remains stationary; and the moveable cover moves from the first intermediate configuration to the open configuration whilst the retractable roof moves from the retracted configuration to the deployed configuration.

16. A vehicle according to claim 1, the vehicle comprising:

a vehicle body having a first region that is exposed when the retractable roof is in the retracted configuration;

a first moveable panel configured to move between a stowed configuration and a deployed configuration, the first moveable panel being attached to the moveable cover so that when the first moveable panel is in the deployed configuration and the moveable cover is in the closed configuration the first moveable panel covers the first region of the vehicle body; and a fifth electric motor coupled to the first moveable panel to be capable of imparting motion to the first moveable panel so that, when the fifth electric motor is activated, the fifth electric motor causes the first moveable panel to move between the stowed configuration and the deployed configuration.

17. A vehicle according to claim 16, wherein the first moveable panel is attached to the moveable cover so that when the moveable cover is in the stowed configuration and the moveable cover is in the closed configuration the first moveable panel is housed within the housing.

18. A vehicle according to claim 16, wherein the control unit is configured to control the activation of the fifth electric motor so that, during the movement of the retractable roof between the deployed configuration and the retracted configuration, the first moveable panel moves partially simultaneously, with the retractable roof and/or the moveable cover, between the stowed configuration and the deployed configuration.

19. A vehicle according to claim 16, wherein the vehicle body has a second region that is exposed when the retractable roof is in the retracted configuration and the vehicle comprises:

a second moveable panel configured to move between a stowed configuration and a deployed configuration, the moveable panel being attached to the moveable cover so that when the moveable panel is in the deployed configuration and the moveable cover is in the closed configuration the moveable panel covers the second region of the vehicle body; and a sixth electric motor coupled to the second moveable panel to be capable of imparting motion to the second moveable panel so that, when the sixth electric motor is activated, the sixth electric motor causes the second moveable panel to move between the stowed configuration and the deployed configuration.

20. A vehicle according to claim 19, wherein the second moveable panel is attached to the moveable cover so that when the moveable cover is in the stowed configuration and the moveable cover is in the closed configuration the second moveable panel is housed within the housing.

21. A vehicle according to claim 19, wherein the control unit is configured to control the activation of the sixth electric motor so that, during the movement of the retractable roof between the deployed configuration and the retracted configuration, the second moveable panel moves partially simultaneously, with the retractable roof and/or the moveable cover, between the stowed configuration and the deployed configuration.

22. A vehicle according to claim 19, wherein the first and second moveable panels are attached to the moveable cover on opposite sides of a longitudinal centreline of the vehicle.

* * * * *